(12) United States Patent
Kenderian et al.

(10) Patent No.: US 11,396,045 B2
(45) Date of Patent: Jul. 26, 2022

(54) MONITORING DURING ADDITIVE MANUFACTURING PROCESS USING THERMOCOUPLES

(71) Applicant: The Aerospace Corporation, El Segundo, CA (US)

(72) Inventors: Shant Kenderian, Pasadena, CA (US); Tait DeWitt McLouth, Los Angeles, CA (US); Joseph T. Case, Hawthorne, CA (US); Dhruv N. Patel, Cerritos, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 149 days.

(21) Appl. No.: 16/299,021

(22) Filed: Mar. 11, 2019

(65) Prior Publication Data

US 2020/0290121 A1 Sep. 17, 2020

(51) Int. Cl.
*B29C 67/00* (2017.01)
*B22F 10/20* (2021.01)
*B33Y 30/00* (2015.01)
*B33Y 10/00* (2015.01)

(52) U.S. Cl.
CPC .............. *B22F 10/20* (2021.01); *B33Y 10/00* (2014.12); *B33Y 30/00* (2014.12)

(58) Field of Classification Search
CPC ....... B33Y 10/00; B33Y 40/00; B29C 64/245; B29C 64/295
See application file for complete search history.

(56) References Cited

U.S. PATENT DOCUMENTS

| | | | |
|---|---|---|---|
| 9,561,626 B2* | 2/2017 | Griszbacher | B29C 64/393 |
| 10,067,499 B2* | 9/2018 | Bheda | B29C 64/118 |
| 2016/0096326 A1* | 4/2016 | Naware | B29C 64/245 |
| | | | 425/143 |
| 2017/0165917 A1* | 6/2017 | McKiel, Jr. | B29C 64/118 |
| 2018/0071986 A1* | 3/2018 | Buller | B29C 64/386 |
| 2018/0111319 A1* | 4/2018 | Brezoczky | B29C 64/35 |

* cited by examiner

*Primary Examiner* — Joseph S Del Sole
*Assistant Examiner* — Thu Khanh T Nguyen
(74) *Attorney, Agent, or Firm* — LeonardPatel PC

(57) ABSTRACT

A build plate may include one or more thermocouples placed on an underside of the build plate. The one or more thermocouples output temperature fluctuation to assist in monitoring for build plate separation of a product located on top of the build plate.

20 Claims, 11 Drawing Sheets

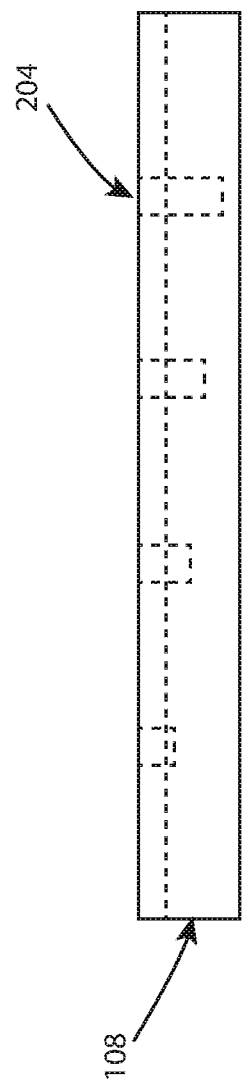

MONITORING DURING ADDITIVE MANUFACTURING PROCESS USING THERMOCOUPLES

STATEMENT OF GOVERNMENT INTEREST

This invention was made with government support under Contract No. FA8802-09-C-0001. The government has certain rights in the invention.

FIELD

The present invention relates to an additive manufacturing process, and more particularly, to monitoring build plate separation during the additive manufacturing process.

BACKGROUND

With additive manufacturing process, larger print beds or multi-laser systems may be used. For example, a build module may include a powder hopper and a build plate chamber. The powder hopper contains metal powder, which is moved on top of a build plate located within the build plate chamber. A laser then melts a pattern and this pattern becomes a solid sheet of metal.

With this manufacturing process, only the top layer is exposed preventing the bottom layer from being seen. As a part is being built over the course of two to three days, and even longer in some cases, the bottom layer, which is not visible to the naked eye, may become warped during this process.

This warpage is referred to as build plate separation due to built up residual stresses in the part. In one example, significant warpage may occur due to large amounts of residual stress. The warpage may ruin the dimensional integrity and usefulness of the part.

Thus, an alternative process for monitoring build plate separation may be more beneficial to allow a user to stop the manufacturing process, make appropriate changes to the design or parameters of the part, and restart.

SUMMARY

Certain embodiments of the present invention may provide solutions to the problems and needs in the art that have not yet been fully identified, appreciated, or solved by current monitoring techniques for additive manufacturing. For example, some embodiments generally pertain to detecting build plate separation of a large three-dimensional (3D) printed part by way of thermocouples.

In an embodiment, an apparatus may include one or more thermocouples placed on an underside of a build plate, configured to output temperature fluctuation to assist in monitoring for build plate separation of a product located on top of the build plate.

In another embodiment, an apparatus may include a build plate. On the underside of the build plate, a plurality of grooves are machined at various depths and thermocouples are placed therein to analyze temperature fluctuations during the additive manufacturing process. When the temperature is abnormal, the additive manufacturing process is stopped to avoid complete build plate separation.

In yet another embodiment, an apparatus may include one or more thermocouples placed on an underside of a build plate and opposite to ends of a part to be manufactured. The apparatus may also include one or more thermocouple readers configured to monitor and record the temperature observed during an additive manufacturing process of the part. When the one or more thermocouple readers detect an abnormal decrease in temperature, the additive manufacturing process is halted to prevent build plate separation.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2B is a cross-section diagram illustrating build plate with a plurality of grooves at varying depths, according to an embodiment of the present invention

DETAILED DESCRIPTION OF THE EMBODIMENTS

Figure 1:
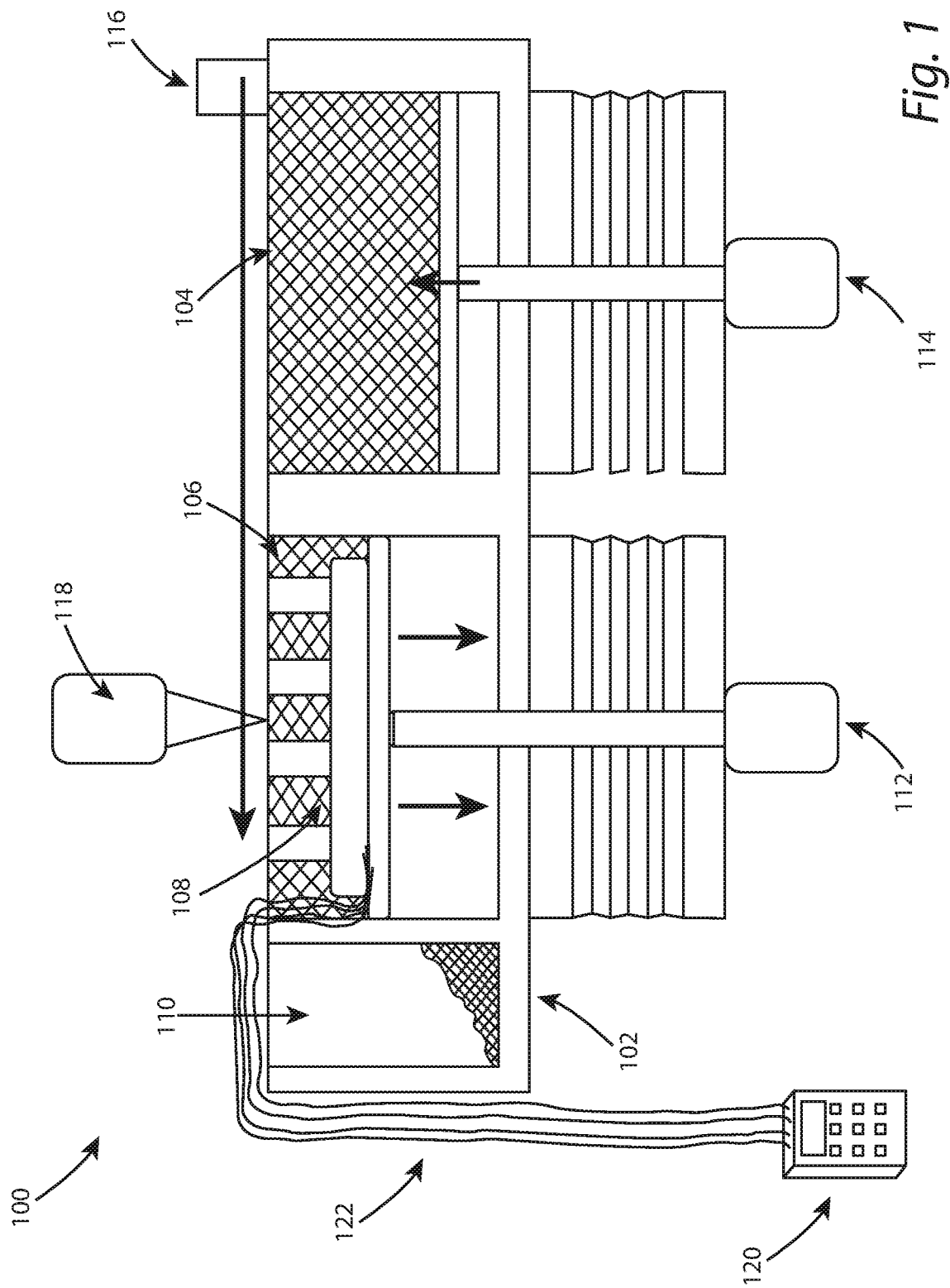
FIG. 1 is a block diagram illustrating an additive manufacturing monitoring system configured to monitor for build plate separation, according to an embodiment of the present invention.

FIG. 1 is a block diagram illustrating an additive manufacturing monitoring system 100 configured to monitor for build plate separation, according to an embodiment of the present invention. In some embodiments, additive manufacturing monitoring system 100 includes a build module 102 that contains a hopper 104, a build plate chamber 106, and a powder overflow chamber 110. Located within build plate chamber 106 is a build plate 108. A more detailed description of build plate 108 is described below with respect to FIG. 2

Figure 2A:
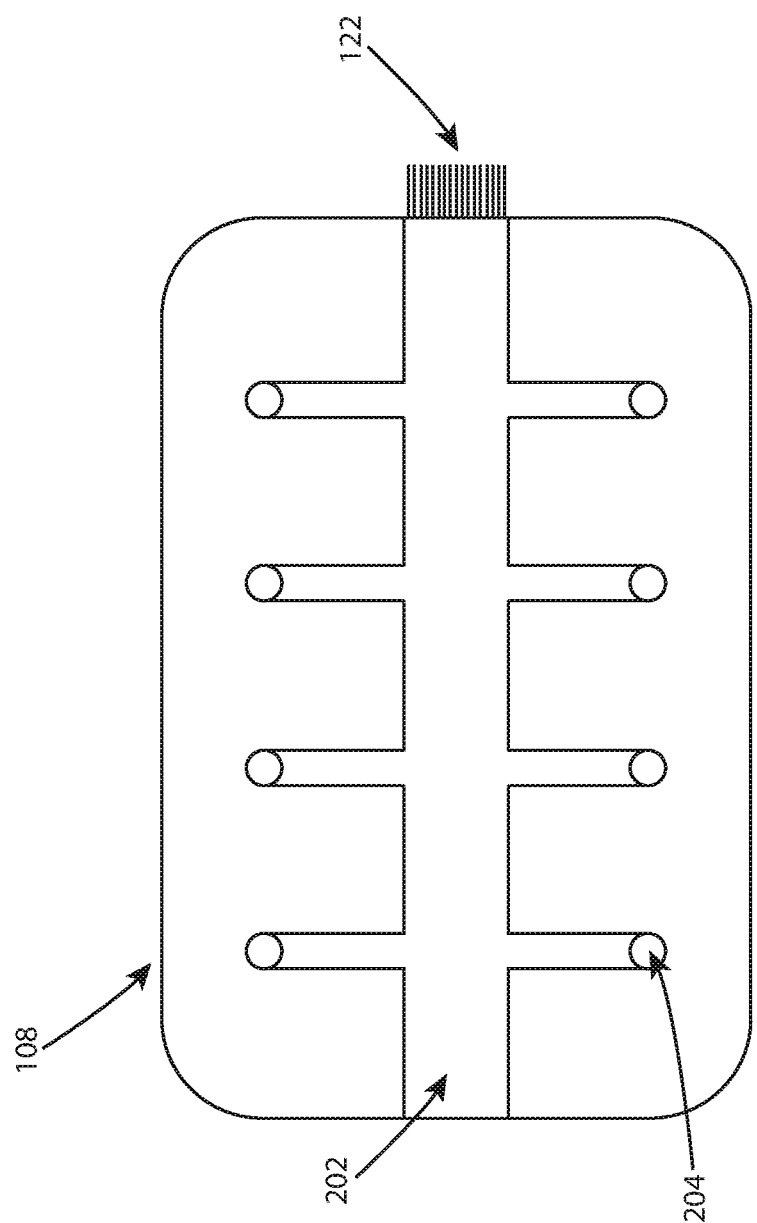
FIG. 2A is a block diagram illustrating an underside of build plate located within the build plate chamber of FIG. 1, according to an embodiment of the present invention.

FIG. 2A is a block diagram illustrating a build plate 108 located within the build plate chamber of FIG. 1, according to an embodiment of the present invention. In this embodiment, FIG. 2 shows an underside of build plate 108, with the machined routing for thermocouples. In some embodiments, the machined routing may be for k-type thermocouples. Build plate 108 may be made of 4130 steel in some embodiments.

In this embodiment, a plurality of grooves 202 are machined (or milled) into build plate 108. Depending on the embodiment, each groove 202 may be machined at same or various depths. See, for example, FIG. 2B, which is a cross-section diagram illustrating build plate 108 with a plurality of grooves 202 at varying depths, according to an embodiment of the present invention. Grooves 202 allow for strategic placement of thermocouples 204. Thermocouples 204 are connected to one or more thermocouple readers (see item 120 of FIG. 1) by way of thermocouple wires 120. Thermocouple readers in some embodiments may be composed of two 4-channel data loggers that monitor and record the temperature observed during the additive manufacturing process.

In an embodiment, thermocouples 204 are placed in locations where the product is more likely to suffer build plate separation or stress. Build plate separation or stress may be caused by residual stresses resulting from the repeated localized melting and cooling of the built part. With a product such as a horizontal rod, thermocouples 204 are placed on the underside of build plate 108. This way, thermocouples 204 are directly opposite to that of the ends of the product, and may accurately monitor temperature during the additive manufacturing process.

Returning to FIG. 1, hopper 104 includes metal powder, for example. This metal powder is moved into build plate chamber 106. For example, when hopper piston motor 114 pushes the metal powder up and out of hopper 104, a re-coater arm 116 is configured to move the metal powder into build plate chamber 106, and more specifically, onto build plate 108. Any excess metal powder may then flow into powder overflow chamber 110 for collection. As the metal powder sits on top of build plate 108, laser 118 may melt a pattern in a new layer, on top of build plate 108. For each pass, build plate piston motor 112 lowers build plate 108.

However, while the product manufacturing process is underway, build plate separation cannot be determined until the end of the manufacturing process. To cure this deficiency, and to monitor for a stress within the product manufactured within build plate chamber 106, one or more thermocouple readers 120 are connected by way of thermocouple wires 122 to the underside of build plate 108. In some embodiments, build plate 108 is a stainless steel plate. Build plate 108, however, is not limited to a stainless steel plate and may be composed of any appropriate metal material for selective laser melting.

Upon detection of build plate separation by thermocouple readers 120, the additive manufacturing process may automatically cease by way of a computing device or may manually shut off. This allows an engineer to adjust the parameters for the additive manufacturing process to prevent or mitigate against any defects within the product. Alternatively, the process may be aborted to avoid additional cost as loss of time.

To route thermocouple wires 122 from beneath build plate 108, thermocouple wires 122 are fed into overflow chamber 110 and out through the overflow chamber 104, which captures unused metal powder. Adequate length is provided to thermocouple wires 122 to ensure that thermocouple wires 122 are fed continuously to build plate 108 as build plate 108, including thermocouple wires 122, moves for the entire build duration. During this process, thermocouple wires 122 continuously transmit data to the thermocouple readers 120, located outside of the build module 102.

Figure 3:
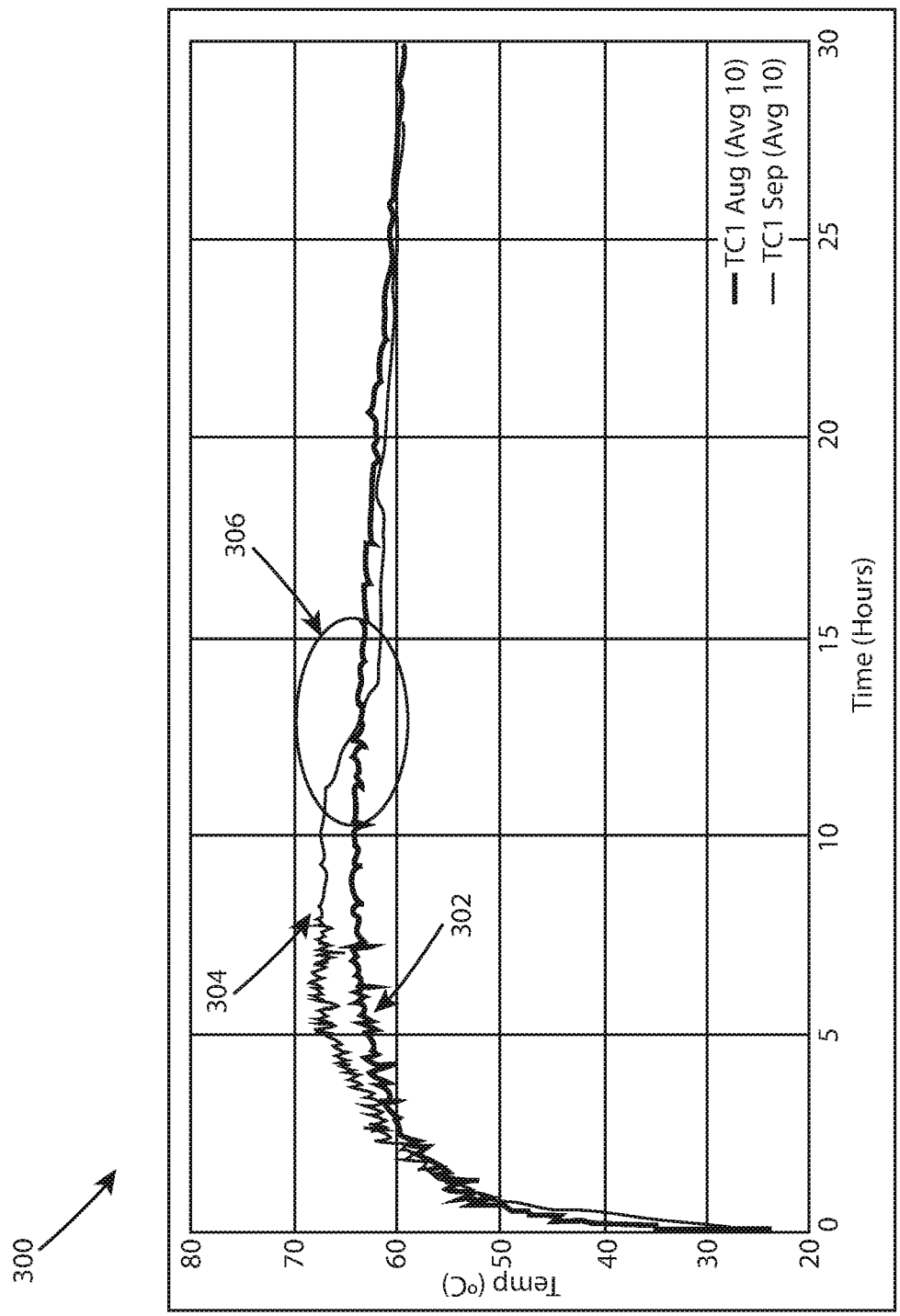
FIG. 3 is a graph illustrating a thermocouple reading of a horizontal rod and a vertical rod, according to an embodiment of the present invention.

FIG. 3 is a graph 300 illustrating a thermocouple reading of a horizontal rod 304 and a vertical rod 302, according to an embodiment of the present invention. In graph 300, plot 302 shows that when the additive manufacturing process begins for a vertical cylinder, the temperature sharply increases. The temperature then reaches a plateau, followed by a gradual cooling period. In terms of the laser, the sharp increase in temperature shows that at the beginning of the process, the melt pool resulting from the laser is close to the thermocouple. As the part being built increases in height, the distance between the melt pool and the thermocouple gradually increases. The rate of increase in temperature, as detected from the bottom of the build plate, gradually decreases.

Figure 4:
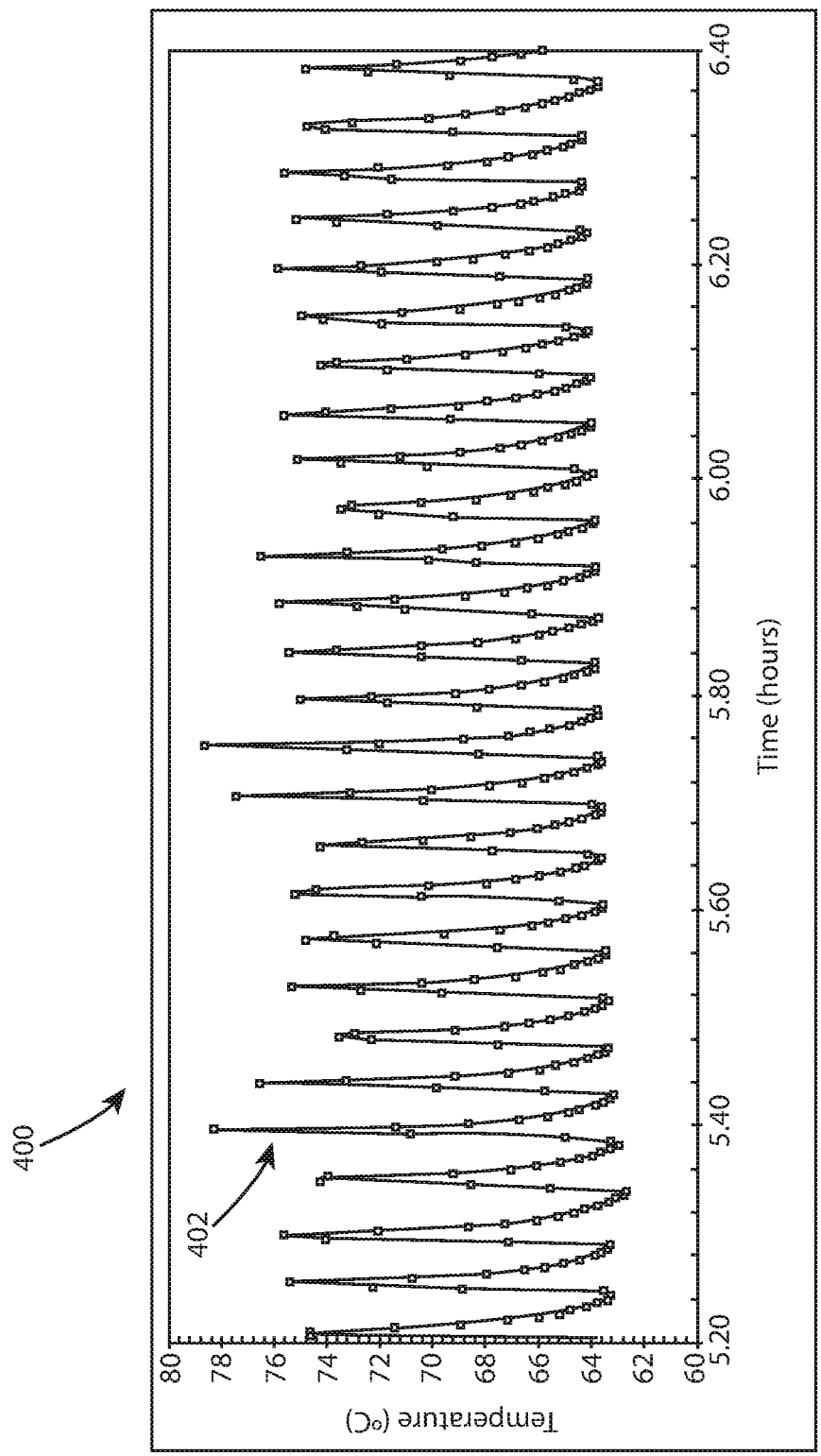
FIG. 4 is a graph illustrating a non-averaged thermocouple of the vertical rod, according to an embodiment of the present invention.

Continuing with the vertical cylinder, FIG. 4 is a graph 400 illustrating a non-averaged thermocouple of the vertical rod, according to an embodiment of the present invention. In graph 400, plot 402 shows peaks and valleys. The peaks represent when the melt pool is directly above the thermocouple as the laser is burning a new layer and the valley represent the cooling that results from the laser moving to a different spot and brief stoppage to allow for the hopper and the re-coater arm to deposit a new powder layer onto the build plate.

Returning to FIG. 3, with high residual stress, some parts such as the horizontal rod is bent and separates from the build plate. In FIG. 3, plot 304 shows a temperature drop in region 306. This temperature drop corresponds to the build plate separation during the additive manufacturing process. Normally, the temperature of the build plate is not monitored during the additive manufacturing process, and therefore, build plate separation may go undetected until the additive manufacturing process is complete. By monitoring the temperature in relation to plot 304 of FIG. 3, build plate separation may be detected sooner than expected.

Figure 5:
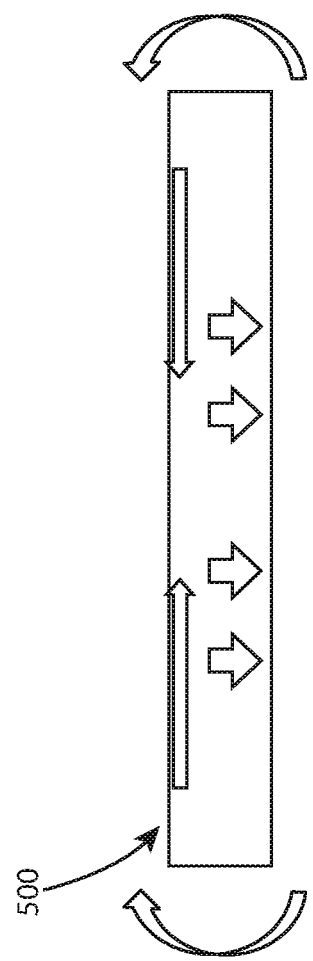
FIG. 5 is a diagram illustrating a product (or horizontal rod), according to an embodiment of the present invention.

FIG. 5 is a diagram illustrating a product (e.g., horizontal rod) 500, according to an embodiment of the present invention. This embodiment shows that cooling creates internal tensile force near top surface of product 500. While the free surface at the top of the product 500 is allowed to cool, the internal parts and bottom of product 500 remains hot. The expansion and contraction resulting for this heat gradient contributes to a constant buildup of internal residual stresses. The net force, however, may cause one or more edges of product 500 to curl upwards, thereby separating the edge of product 500 from the build plate.

Figure 6:
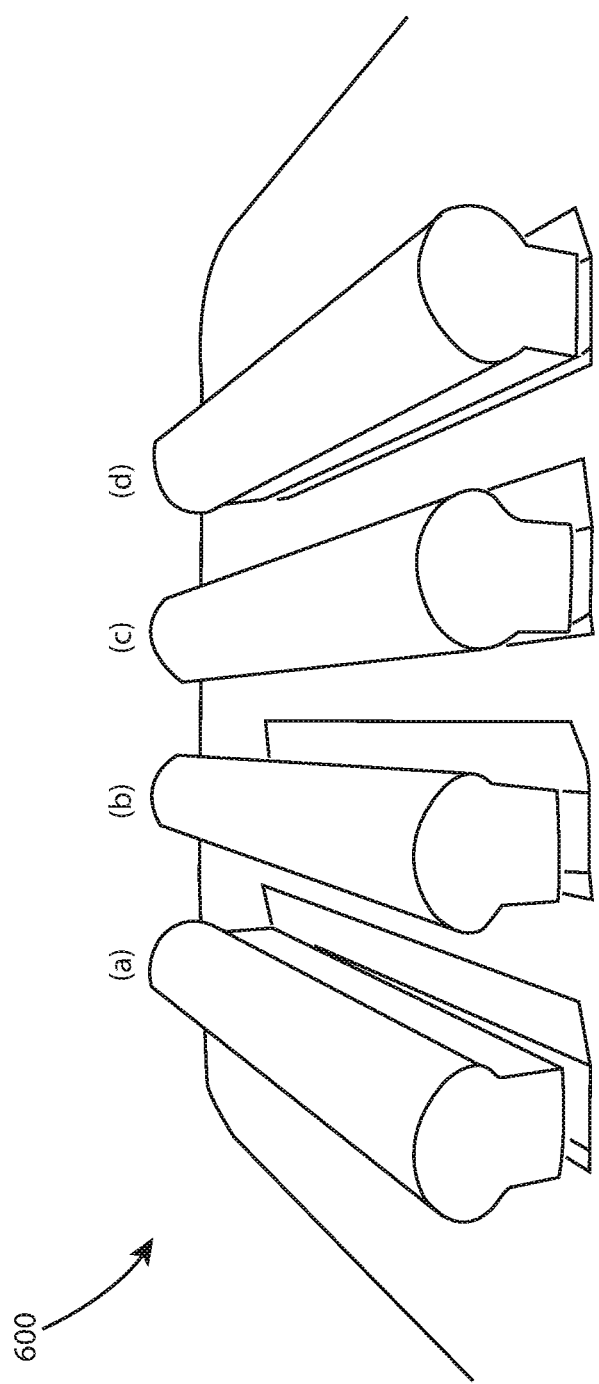
FIG. 6 is an image illustrating horizontal rods with build plate separation, according to an embodiment of the present invention.

FIG. 6, which is an image 600, illustrates build plate separation for products (a)-(d). In this image, products (a)-(d) show significant amount of lift from the build plate around the edges of products, where the stress would be the highest.

Figure 7:
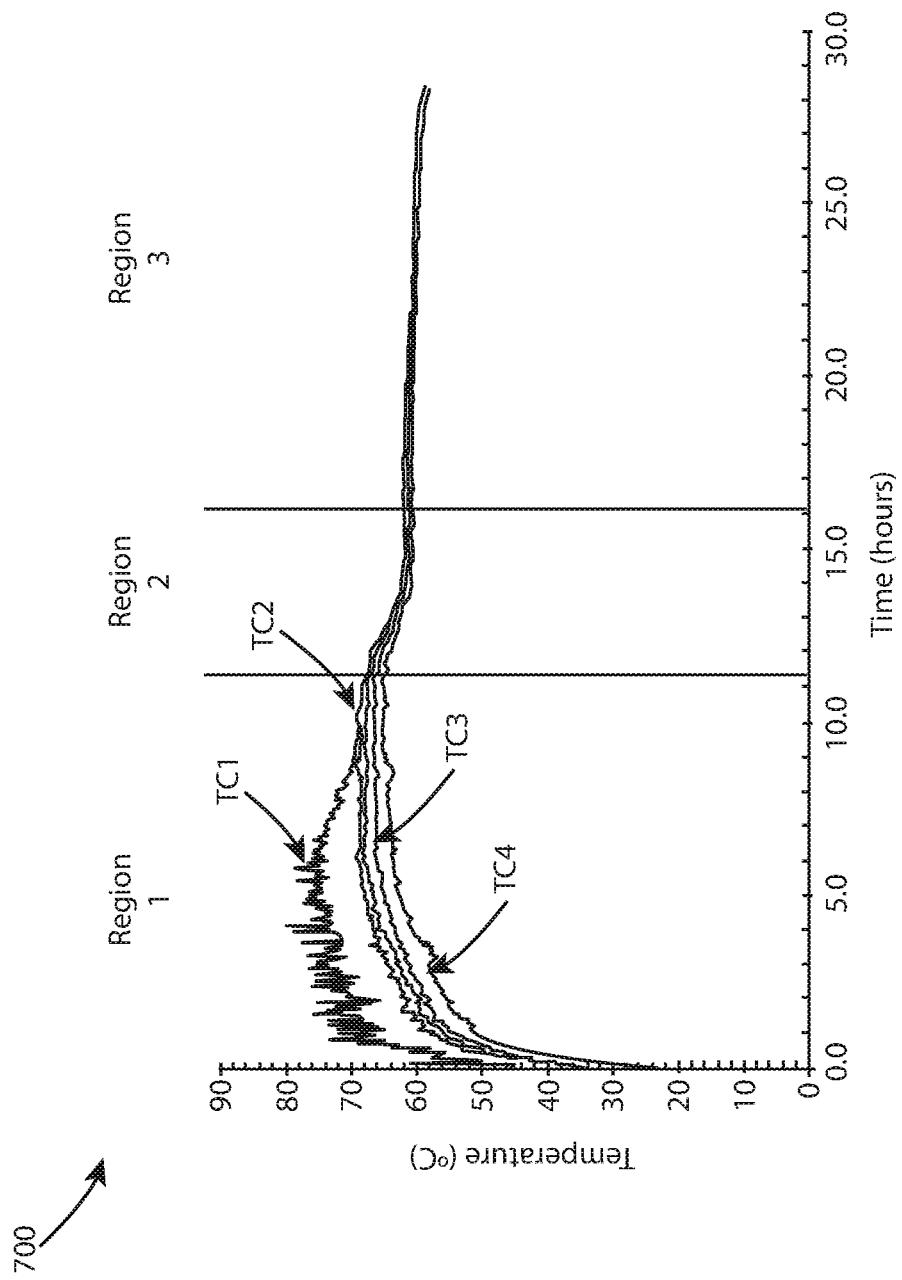
FIG. 7 is a graph illustrating build plate separation with respect to region 1, region 2, and region 3, according to an embodiment of the present invention.

FIG. 7 is a graph 700 illustrating build plate separation with respect to Region 1, Region 2, and Region 3, according to an embodiment of the present invention. The plot represents data from four different thermocouples, TC1-TC4. While the temperature fluctuation measured by each thermocouple TC1-TC4 differed, they all exhibited a similar temperature drop as that shown in region 306 of FIG. 3. In all cases, the drop was correlated a build plate separation.

Figure 8:
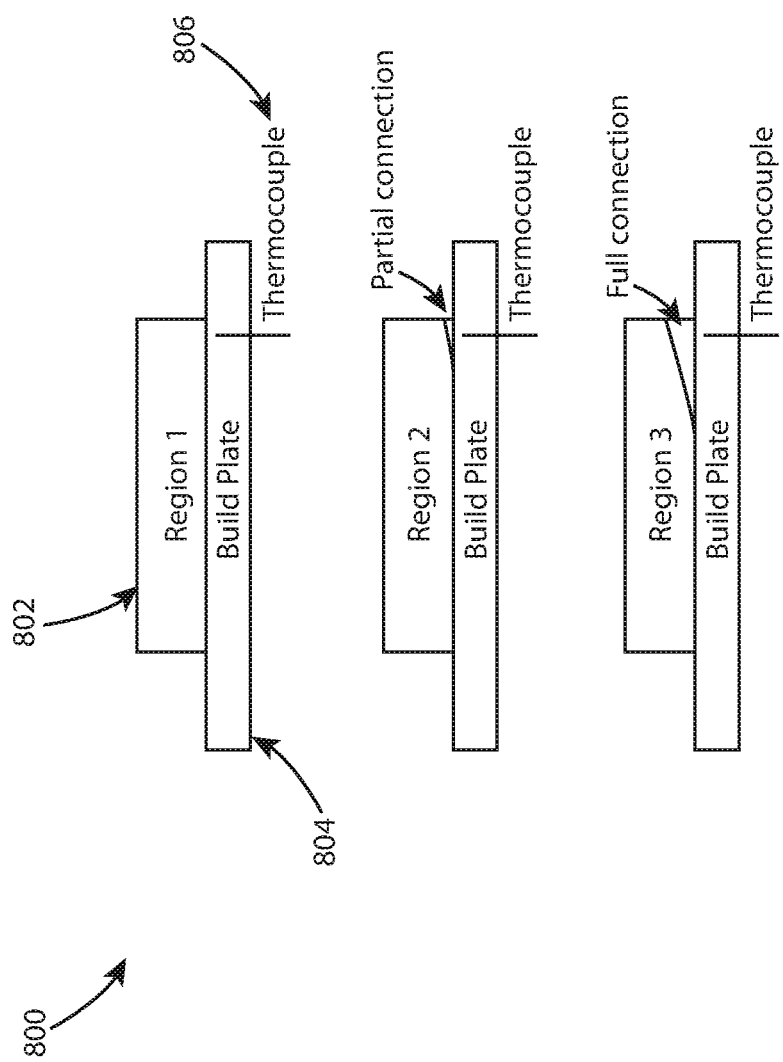
FIG. 8 is a diagram illustrating build plate separation with respect to region 1, region 2, and region 3, according to an embodiment of the present invention.

FIG. 8 is a diagram illustrating build plate separation with respect to Region 1, Region 2, and Region 3 in FIG. 7, according to an embodiment of the present invention. In this embodiment, separation of product 802 from build plate 804 is shown in phases with respect to Region 1, Region 2, and Region 3. In Region 1, product 802 continues to stay attached to build plate 804. Also, in Region 1, good thermal conductivity is shown from the top of product 802 through build plate 804 and thermocouple 806.

In Region 2, however, warpage of product 802 begins to occur, resulting in lost coupling. Specifically, residual stress within product 802 begins to break the ends of product 802 from build plate 804, slowly deteriorating the connection. Also, in Region 2 (see FIG. 7), overall temperature begins to decrease rapidly as heat distribution is less localized around the locations of thermocouple 806.

While Region 2 represents the onset of separation, Region 3 represents the end (or arrest) of the separation. The drop in temperatures detected by thermocouples 806 stops. Build plate 804 comes to a steady temperature, which in turn shows complete separation of the end of product 802 from build plate 804. In this region, the temperature detected by thermocouples 806 is the result of the overall heating of build plate 804 as heat moves through middle of product 802 and into build plate 804, far away from the locations of thermocouples 806.

Figure 9:
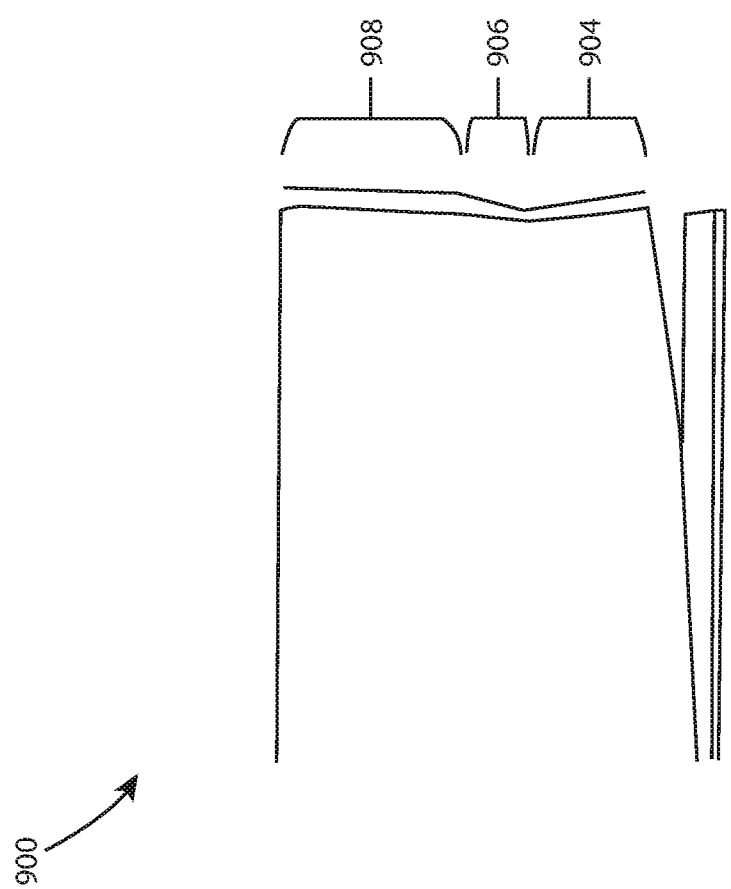
FIG. 9 is an image illustrating build plate separation of a product, according to an embodiment of the present invention.

FIG. 9 is an image 900 illustrating build plate separation of a product 902, according to an embodiment of the present invention. In this embodiment, item 904 represents build plate separation of the initial structure of product 802. Through a height measurement correlated to thermocouple data, the end of this region is marked by square 1004 on plot 1002 of FIG. 10. Item 906 represents the gradual detachment of product 902 from the build plate, and item 908 represents the steady building of the latter half of product 902 after movement due to separation, the onset of which is marked by circle 1010.

Should there be no separation, the profile of the product is expected to have a vertical line with respect to the build plate. Therefore, segment 904 in FIG. 9 was vertical prior to separation. Also, in FIG. 9, segment 906 was built while the separation continued to happen. Conversely, segment 908 was built after the separation came to an end, and therefore, a vertical profile appeared with respect to the build plate.

Figure 10:
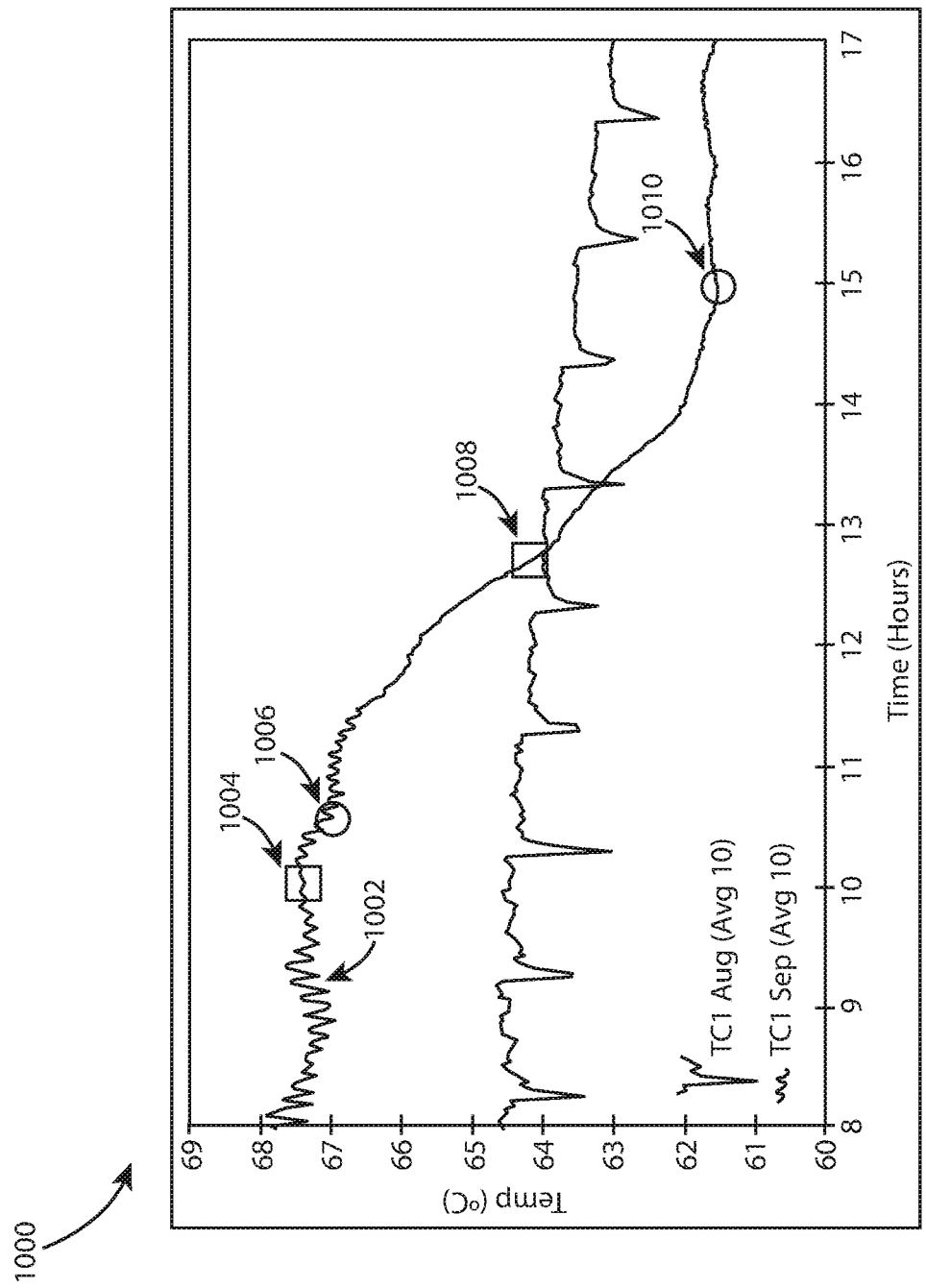
FIG. 10 is a graph illustrating thermocouple readings of build plate separation of a product, according to an embodiment of the present invention.

Considering the length of time it took to build the entire part and relative lengths of segments 904, 906, and 908, the times for the onset and arrest of the separation (beginning and end of segment 906) were estimated and shown as squares 1004 and 1008, respectively. In FIG. 10, the circles indicated by 1006 and 1010 represent points in time where changes in the temperature profile (or slope of the curve) can be measured to indicate the onset and arrest of the separation.

Signal Processing Techniques for Monitoring Temperature Drops During the Manufacturing Process In some embodiments, proper signal analysis techniques are utilized to accurately quantify the behavior of the additive manufacturing monitoring system as the product is being built layer by layer. For example, the temperature trendline may better address the quality of the additively manufactured product during the manufacturing process. Any sharp decreases in the trendline are indications of the product separating during the manufacturing process. When the product separates, inert gas or powder is filled between the product and the build plate. This may result in a large thermal impedance between the laser on top and the thermocouple below the build plate. The large thermal impedance makes it more difficult for heat to transfer between the laser and the thermocouple, which results in a temperature drop. The thermocouple essentially reads the build plate's temperature at this point, with little to no sensitivity to the laser scans on the part above. Heat is conducted laterally to the center of the part where it is still connected, and then through the build plate to the thermocouple wire, rather than straight down through the part and build plate to the wire. The temperature drop rate during separation is much greater than the typical drop rate during the normal manufacturing process, where the thickness of the part continues to increase and increasingly separates the laser from the thermocouple.

However, the signal processing techniques should determine the temperature trendline in the presence of the following phenomena:

temperature spikes indicating the melting spot being closest to the thermocouple temperature spikes appearing at irregular intervals depending on the randomized melt pattern and part geometry spikes are followed by quick cooling as the next layer of raw material is swept across 5 minute cool down during periodic machine rest periods The phenomena listed above may cause great difficulty in obtaining the temperature trendline since it causes what may be considered as high non-zero mean noise. Adaptive filtering, Kalman filtering, curve-fitting, n-point splines, and more may be used to determine the trendline in the presence of this noise. Different classifiers may then be used on the trendline to determine at least the 2-state problem: normal build or broken part; however, additional states may be considered in practice.

In an embodiment, an apparatus may include one or more thermocouples placed at predetermined locations on an underside of a build plate to monitor temperature fluctuations of the build plate during the additive manufacturing process. When the one or more thermocouples output abnormal temperature fluctuation, additive manufacturing parameters are adjusted to avoid production of a faulty product, or the additive manufacturing process is halted to avoid complete build plate separation of the product located on top of the build plate.

In another embodiment, an apparatus may include a plurality of grooves machined on an underside of a build plate to allow strategic placement of one or more thermocouples. The one or more thermocouples output temperature fluctuation to assist in monitoring for build plate separation of a product located on top of the build plate.

In yet another embodiment, an apparatus may include a plurality of grooves machined on an underside of a build plate to allow strategic placement of one or more thermocouples. The one or more thermocouples output temperature fluctuation to assist in monitoring for build plate separation of a product located on top of the build plate.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus configured to perform real-time monitoring of build plate separation during additive manufacturing process, comprising:
    one or more thermocouples placed at predetermined locations at one or more expected failure sites of a part and on an underside of a build plate, wherein the one or more thermocouples are configured to detect temperature fluctuations indicative of heat flowing from the part placed on top of the build plate during the additive manufacturing process;
    one or more thermocouple readers connected to the one or more thermocouples via one or more thermocouple wires, wherein the one or more thermocouple readers configured to monitor and record the temperature fluctuations from the one or more thermocouples, wherein
        when the one or more thermocouple readers record an abnormal temperature fluctuation from the one or more thermocouples, a computing device is configured to identify the build plate separation from the abnormal temperature fluctuation and automatically halt the additive manufacturing process in real-time, and
        the abnormal temperature fluctuation is a temperature drop from the heat flowing from the part placed on top of the build plate during the additive manufacturing process, the temperature drop is defined by a drop rate in temperature that exceeds an ideal temperature cool down rate for the part based on a geometry of the part.

2. The apparatus of claim 1, wherein the build plate comprises a plurality of grooves machined on the underside of the build plate to allow for strategic placement of the one or more thermocouples.

3. The apparatus of claim 1, wherein each of the plurality of grooves have same or varying depths.

4. The apparatus of claim 1, wherein the one or more thermocouples are connected to one or more thermocouple readers via one or more thermocouple wires.

5. The apparatus of claim 4, wherein the one or more thermocouple readers are configured to monitor and record temperature observed during the additive manufacturing process.

6. The apparatus of claim 4, wherein the one or more thermocouple wires are routed from the one or more thermocouple readers to the underside of the build plate.

7. The apparatus of claim 6, wherein the one or more thermocouple wires are fed into, and out through, an overflow chamber.

8. The apparatus of claim 7, wherein the one or more thermocouple wires has sufficient length to ensure that the one or more thermocouple wires continuously transmit data from the one or more thermocouples to the one or more thermocouple readers during movement of the build plate.

9. The apparatus of claim 1, wherein the placement of the one or more thermocouples is determined where the part is more likely to encounter build plate separation or stress.

10. An apparatus configured to monitor build plate separation in real-time during additive manufacturing process, comprising:
    a plurality of grooves machined on an underside of a build plate to allow strategic placement of one or more thermocouples, wherein
        the one or more thermocouples are placed on an underside of the build plate at one or more expected failure sites of a part and is configured to output temperature fluctuation, thereby monitoring build plate separation of the part located on top of the build plate; and
    one or more thermocouple readers connected to the one or more thermocouples via one or more thermocouple wires, wherein the one or more thermocouple readers configured to monitor and record the temperature fluctuations from the one or more thermocouples, wherein
        when the one or more thermocouple readers record an abnormal temperature fluctuation from the one or more thermocouples, a computing device is configured to identify the build plate separation from the abnormal temperature fluctuation and automatically halt the additive manufacturing process, and
        the abnormal temperature fluctuation is a temperature drop from the heat flowing from the part placed on top of the build plate during separation being much greater than a nominal cool down during the additive manufacturing process, the temperature drop is defined by a drop rate in temperature that exceeds an ideal temperature cool down rate for the part based on a geometry of the part.

11. The apparatus of claim 10, wherein each of the plurality of grooves are machined into the build plate at varying depths to allow for the strategic placement of the one or more thermocouples.

12. The apparatus of claim 10, wherein the one or more thermocouples are directly opposite to that of ends of the part to be manufactured, such that temperature is accurately monitored during the additive manufacturing process.

13. The apparatus of claim 12, wherein the one or more thermocouples are placed at one or more locations on the underside of build plate where the part to be manufactured on opposite side of the build plate is more likely to suffer build plate separation or stress.

14. The apparatus of claim 10, wherein the one or more thermocouples are connected to one or more thermocouple readers via one or more thermocouple wires.

15. The apparatus of claim 14, wherein the one or more thermocouple readers are single channel or multi-channel data loggers configured to monitor and record the temperature observed during an additive manufacturing process.

16. The apparatus of claim 14, wherein the one or more thermocouple wires are routed from the one or more thermocouple readers to the underside of the build plate.

17. The apparatus of claim 16, wherein the one or more thermocouple wires are fed into, and out through, an overflow chamber.

18. The apparatus of claim 17, wherein the one or more thermocouple wires has sufficient length to ensure that the one or more thermocouple wires continuously transmit data from the one or more thermocouples to the one or more thermocouple readers during movement of the build plate.

19. An apparatus configured to monitor build plate separation in real time during additive manufacturing process, comprising:

one or more thermocouples placed on an underside of a build plate and at one or more expected failure sites of a part;

one or more thermocouple readers configured to monitor and record the temperature fluctuations flowing from the part to a build plate during an additive manufacturing process of the part; and a computing device configured to identify the build plate separation from an abnormal temperature fluctuation and automatically halt the additive manufacturing process, when the one or more thermocouple readers receive the abnormal temperature fluctuation from the one or more thermocouples, and the abnormal temperature fluctuation is a temperature drop from the heat flowing from the part placed on top of the build plate during the additive manufacturing process, the temperature drop is defined by a drop rate in temperature that exceeds an ideal temperature cool down rate for the part based on a geometry of the part.

20. The apparatus of claim 19, wherein the build plate comprises a plurality of grooves machined into the build plate at varying depths to allow for strategic placement of the one or more thermocouples.

* * * * *